Sept. 2, 1930.  W. AHLFORS  1,774,539
FISH LURE
Filed Sept. 4, 1928
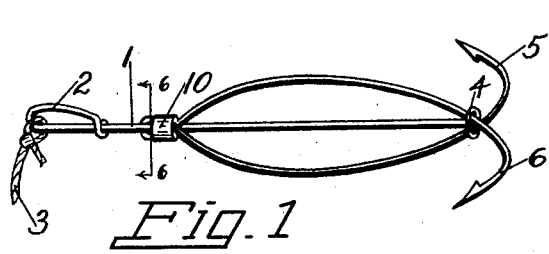
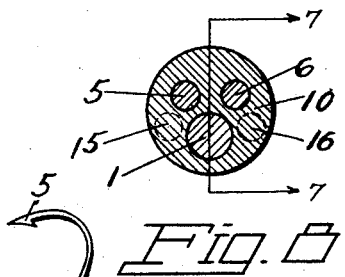
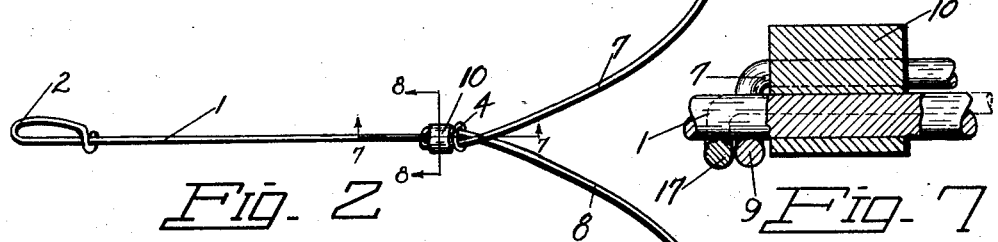
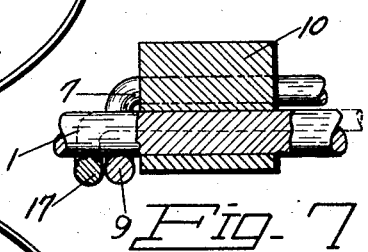
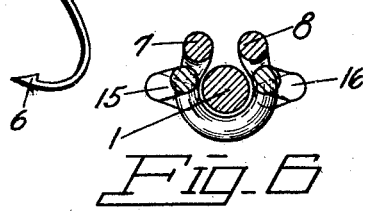
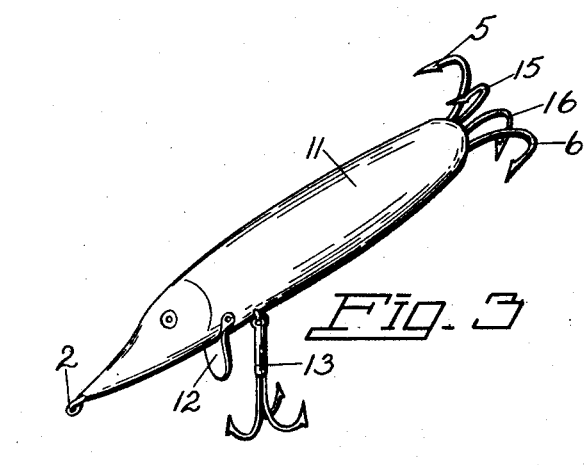
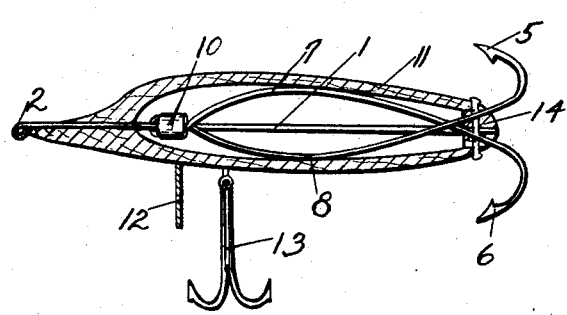
Wilhelm Ahlfors Inventor
By Herbert E. Smith
Attorney Patented Sept. 2, 1930

1,774,539

UNITED STATES PATENT OFFICE

WILHELM AHLFORS, OF SPOKANE, WASHINGTON

FISH LURE

Application filed September 4, 1928. Serial No. 303,875.

My present invention relates to an improved fish lure of the type employing a plurality of hooks that are normally retracted, but which are automatically expanded or spread apart, to impale the fish, by a tug on the lure or line as the fish endeavors to free itself from the lure.

The lure may be utilized in combination with an enclosing shell that simulates the bait, or without the shell, and the number of hooks, which are utilized in pairs, may be varied in the adaptation of the lure for different types and sizes of fish.

The primary object of the invention is the provision of a fishing device of this character that is comparatively inexpensive in cost of production, which is simple in construction and automatic and facile in operation, and which is reliable in the performance of its required functions.

In carrying out my invention the hooks are arranged in pairs, and preferably fashioned in pairs from a single piece of wire of suitable strength and resiliency in order that a pair of hooks may co-act with and be supported by a main guide bar, and the invention consists in certain novel combinations and arrangements of parts involving the supporting and guiding means together with the pairs of hooks, as will hereinafter be more fully set forth and claimed.

In the accompanying drawings I have shown one complete example and a modified form of my invention wherein the parts are combined and arranged according to modes I have so far devised for the practical application of the principles of my invention, but it will be understood that changes and alterations may be made in the exemplified structures within the scope of my claim without departing from the principles of my invention.

Figure 1 is a view showing a simplified form of my invention with the hooks retracted, and Figure 2 is a view of the same device with the hooks projected.

Figure 3 is a perspective view of another form of the invention utilizing an enclosing shell and illustrating two pairs of hooks, and Figure 4 is a longitudinal sectional view of the shell or lure with a pair of hooks enclosed therein.

Figure 5 is an end view, as seen from the right, of Figure 3.

Figure 6 is an enlarged detail sectional view as at line 6—6 of Figure 1.

Figure 7 is an enlarged sectional detail view as at line 7—7 of Figure 2. Figure 8 is a sectional detail view as at line 8—8 of Figure 2.

In carrying out my invention I employ a straight bar 1 of suitable length and rigidity, which is fashioned with a loop 2 at one end for attaching the end of the line as at 3. At its other end this bar is fashioned with a guide loop 4 that is bent around into a plane at right angles to the plane of the bar.

The hooks, as 5 and 6, are barbed as usual and are fashioned in pairs from a single piece of resilient but strong wire somewhat similar to a hair pin, but the arms 7 and 8 which are bowed, are crossed, as indicated. At 9 the arms are united by an integral slide loop which is bent at right angles to the plane of the arms so that it can encircle and slide on the straight bar 1, while the crossed arms are passed through the guide loop 4 at the end of the straight bar. A spreader-slide 10 is mounted on the bar 1 and ends of the arms adjacent the slide loop are passed through this slide and retained by it with relation to the bar 1.

The bowed, resilient arms 7 and 8, when the hooks are in the retracted position, or normal position of Figure 1, are disposed at opposite sides of the straight bar 1, and because of their resiliency the arms are held by friction in the guide loop 4 to maintain the hooks in retracted position. When the fish has swallowed the bait and hooks, and then tugs at the line to free itself, the arms are pulled through the guide loop, the spreader-slide 10 is slid along the guide bar 1, and the hooks are projected or distended to position indicated in Figure 2, or the pair of hooks may be only partially distended to a position between the minimum distension of Figure 1 and the maximum distension of Figure 2. When the hooks are distended they become firmly imbedded in the adjoining flesh of the fish and the latter is impaled against release.

In Figures 3, 4, and 5 a shell 11 is illustrated in connection with the lure, said shell being fashioned from suitable material and designed to simulate different kinds of bait as used for different purposes. The lure as thus shown is equipped with the usual spoon or blade 12 and auxiliary hooks 13.

In lieu of the guide loop 4 for the resilient, bowed arms of the hooks a perforated guide plug 14 is fixed in the tail end of the shell for the passage of the two arms, and this perforated plug performs the same functions as the guide loop 4.

A second pair of hooks 15 and 16 are shown in Figures 3, 5, 6 and 7, and dotted in Figure 8. These hooks are designated 15 and 16 and they are fashioned with a slide loop 17 similar to the slide loop 9 of the first pair of hooks, and it will be apparent that if desired, a third pair of hooks may be added to these two pair.

Having thus fully described my invention what I claim as new and desire to secure by Letters Patent is:—

The combination with a guide bar having a guide loop, of a pair of oppositely bowed, resilient, crossed arms passed through said loop and hooks at the ends of said arms, an integral loop uniting said arms and slidable on the bar, and a spreader-slide rigidly encircling said arms and slidable on the bar.

In testimony whereof I affix my signature.

WILHELM AHLFORS.